July 1, 1969  D. R. HERRIOTT ET AL  3,453,166
METHOD AND APPARATUS FOR BONDING TRANSDUCER ELEMENTS
Filed Oct. 11, 1966
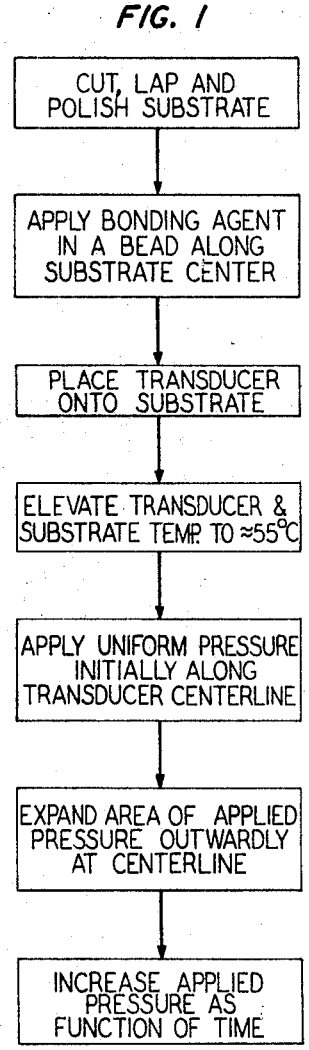
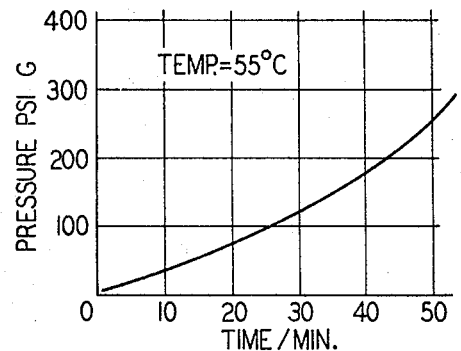
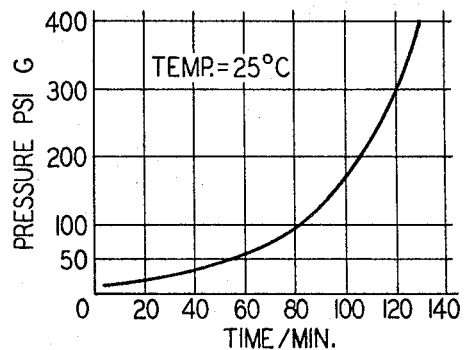
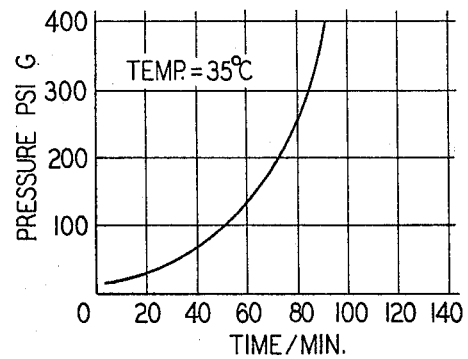
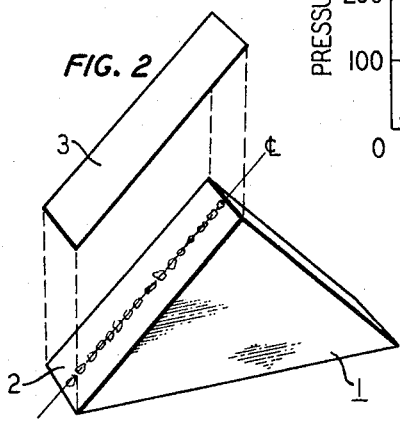
INVENTORS
D. R. HERRIOTT
J. S. JONES
T. R. MEEKER
K. REZNICEK
BY Charles E. Graves
ATTORNEY July 1, 1969     D. R. HERRIOTT ET AL     3,453,166
METHOD AND APPARATUS FOR BONDING TRANSDUCER ELEMENTS
Filed Oct. 11, 1966
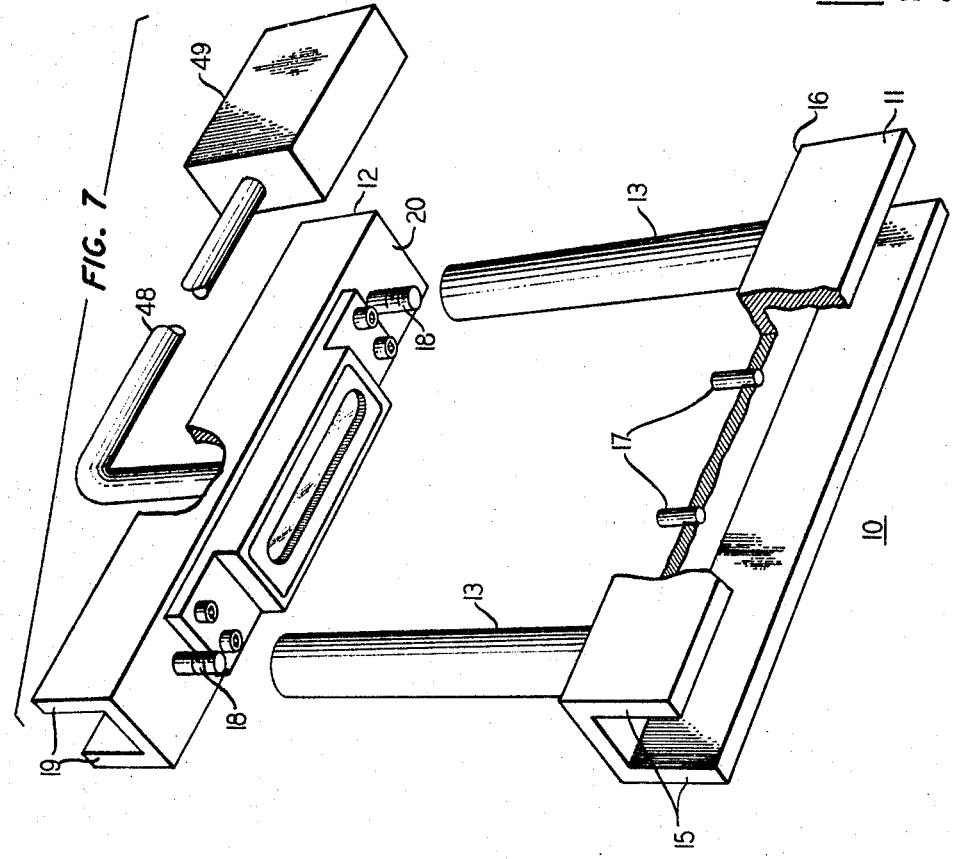
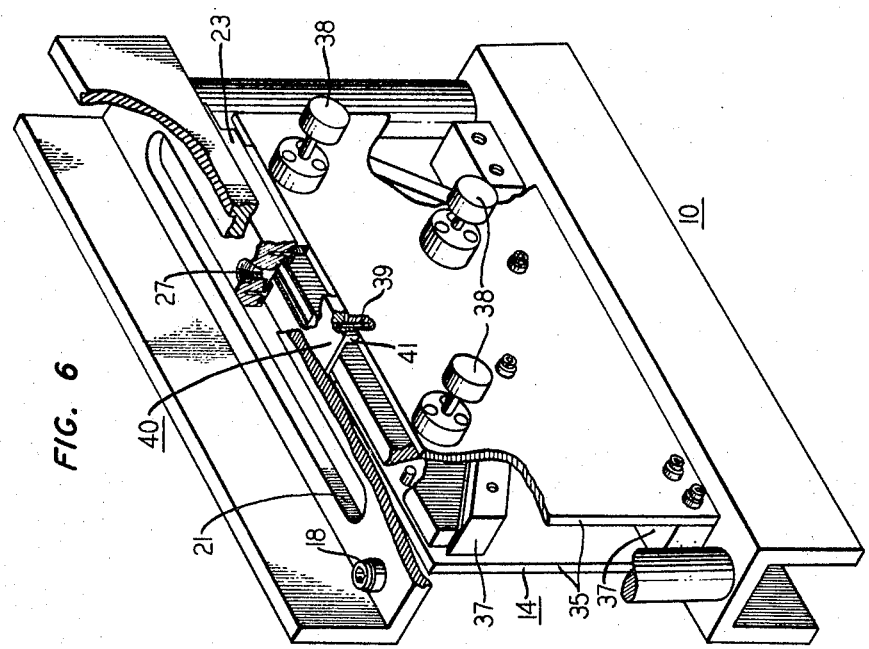

United States Patent Office 3,453,166
Patented July 1, 1969

3,453,166
METHOD AND APPARATUS FOR BONDING TRANSDUCER ELEMENTS
Donald R. Herriott, Morris Township, Morris County, N.J., and Joseph S. Jones, Emmaus, and Thrygve R. Meeker and Kurt Reznicek, Allentown, Pa., assignors to Bell Telephone Laboratories, Incorporated
Filed Oct. 11, 1966, Ser. No. 585,944
Int. Cl. B32b 31/04, 31/20; B05c 5/00
U.S. Cl. 156—295                                    8 Claims

ABSTRACT OF THE DISCLOSURE

A method and apparatus is described for achieving extremely thin and highly uniform adhesive bonds between a transducer and an ultrasonic device substrate. The method teaches the application of initial bonding pressure to the central portion of the transducer-substrate interface, and the very gradual extension of the area of application and of the pressure itself. After such gradual pressure and area increments, when the entire transducer is being contacted with pressure, the pressure increments can be speeded up. Apparatus for practicing the method consists of a resilient pressure bag which distends through an elongated slot aligned with the centerline of the transducer. The bag contacts the transducer initially at its centerline and thereafter, with increases in pressure, outwardly of the centerline.

---

This invention relates to a bonding process and associated apparatus, useful particularly in achieving exceedingly thin and uniform bonds.

While intended for a wide range of applications, the invention is described hereinafter principally in relation to the bonding of transducers to device surfaces such as ultrasonic delay lines. By transducer is meant a thin, planar, elastic, substantially rigid body such as a quartz piezoelectric crystal. However, other piezoelectric, piezomagnetic or magnetostrictive materials are comprehended by the invention claimed herein.

As is well known, ultrasonic delay lines consist of a delay medium such as fused quartz and one or more transducers bonded thereto for converting electric into mechanical energy, and vice versa. The transducers typically are piezoelectric and for maximum efficiency measure about a half wavelength thick at the operating frequency. In order that the bond effects be negligible, the bonds must be very thin in comparison with the acoustic wavelength—of the order of 0.01λ.

The information storing capacity of ultrasonic delay lines varies directly with the bandwidth and frequency of the delay line. For this reason and others, it is desirable to construct such delay lines for broadband operation in regions of very high frequency.

Heretofore, however, the upper operating frequency limit for ultrasonic delay lines has been about 50 mc./s., due primarily to the difficulty of producing sufficiently thin and uniform bonds.

Typically, bonding processes of the prior art involve pressing the transducer and bonding material against a substrate with, e.g., a mechanically actuated granite slab. This method rarely produced uniform (i.e., ±600 A.) bonds, partly because of the problems in keeping the slab exactly parallel to the substrate.

Additionally, for very thin bonds the flow of the adhesive during the bonding process becomes a very critical function of the way in which the pressure is applied. The past practice of using a constant pressure applied across the entire bond surface throughout the operation tended to trap the adhesive, resulting in the formation of clusters within the bond. The resulting nonuniformity adversely affected the electrical phase properties of the bond, especially at high frequencies.

Both of these problems are compounded when the devices call for greatly elongated transducers such as used with dispersive diffraction delay lines.

Accordingly, a prime object of this invention is to produce very thin, consistently uniform bonds between two media, one of which is usually thin—as for example, between a transducer and its substrate.

Another object of this invention is to raise substantially the upper operating frequency limit of ultrasonic delay lines with bonded transducers, especially diffraction delay lines.

A further object of this invention is to enhance the performance of delay lines.

These and other objects are achieved pursuant to the invention, broadly, by a bonding process including the steps of applying to the transducer an initial pressure at a central region such as a centerline, and thereafter gradually extending the area of application outwardly of this region while increasing the pressure in accordance with a predetermined pressure-time cycle specific to the type of bonding agent and ambient conditions, the final pressure being uniform over the entire area of the application.

In accordance with one aspect of the invention, it has been found highly desirable to provide for a lower rate of pressure increase toward the beginning of the bonding step. This allows the adhesive to flow outwardly as the bond becomes thinner in the central region.

The apparatus devised to practice this process has as a key element a resilient pressure bag situated across a slot beneath which the two media, such as a delay line substrate and its transducer, are disposed. The bonding agent, such as epoxy, is applied to the substrate in a bead along the centerline. The pressure bag, advantageously neoprene or the like, responds to the application of an initial pressure of distending through the slot and into contact with the centerline of the transducer. Thereafter as the pressure is gradually increased—at first slowly—the bag expands to contact more of the transducer surface. Toward the end of the pressure-time-cycle the pressure is increased relatively rapidly to its final value. Typically, the cycle duration is from 15 minutes to 2 hours; the apparatus is maintained at about 57° C.; and the final pressure is about 400 p.s.i.

This process and apparatus for practicing same produces a bond with epoxy, for example, that is consistently uniform in thicknesses as little as 800 A. and less. Prior art processes yield individual bonds not only of highly varying thickness from bond to bond, but also of unacceptably high nonuniformity within a given bond. As a direct consequence of the bond quality achieved in accordance with the present invention, it is possible to produce ultrasonic delay lines with unbacked transducers having bandwidths as high as 67% of mid-band frequency at frequencies up to 100 mc./s. and—with careful controls—even up to 500 mc./s.

By way of further comparison, the inventive process creates a bond with phase uniformity of a few degrees across an 8-inch long transducer. The best phase uniformity one could expect in a similarly shaped transducer using earlier processes was about 90 degrees.

A feature of this invention, accordingly, relates to a bonding process step in which the application of pressure to the transducer is effected in accordance with a prescribed pressure-time-cycle characterized by smaller pressure increments toward the beginning of the cycle.

A further feature of the invention involves the application and distribution of bonding pressure in which a pressure-imparting means first touches the center of the transducer and thereafter spreads outwardly with pressure increases, thus avoiding the formation of lumps in the bond.

These and other objects and features of the invention are delineated in detail in the description to follow of an illustrative embodiment thereof and in the drawing in which:

FIG. 1 is a flow chart illustrative of the inventive process;

FIG. 2 is a schematic diagram of a substrate and transducer;

FIGS. 3–5 are graphs showing various pressure-time-cycles;

FIG. 6 is a frontal perspective of a fixture for practicing the process;

FIG. 7 is a perspective of the fixture frame;

Figure 8:
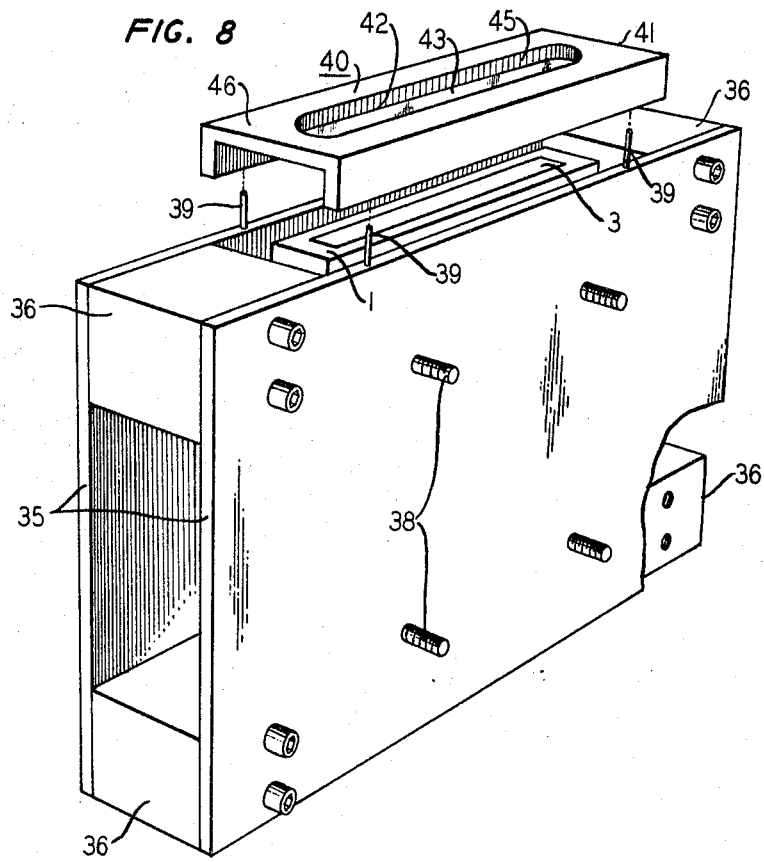
FIG. 8 is a frontal perspective of the fixture device holder.

FIG. 1 summarizes the process steps. A device such as the dispersive delay line medium 1 of FIG. 2 includes a surface 2 which typically has been cut, lapped and polished beforehand. Along the longitudinal centerline of surface 2, a bonding agent is applied preferably as a bead to prevent air entrapment. The transducer 3 is then aligned on the substrate, more or less centrally. Delay line medium 1 typically is made of fused quartz or single crystal materials. Transducer 3 can be of piezoelectric, piezomagnetic, or magnetostrictive materials, for example.

The pressure-time cycle has been found to be extremely critical. After an initial pressure is applied uniformly along the centerline of transducer 3, the pressure is increased very gradually at first, and concomitantly the area to which the gradually increasing pressure is applied is extended outwardly from both sides of the centerline of transducer 3.

The process temperature is determined by the bonding agent and particularly by its flow and curing characteristics. For the epoxy adhesive with metaphenylene diamine hardener, sold by The Dow Chemical Company under the trade name DER 332LC, optimum temperature has been found to be between 50° and 60° C. with the pressure-time cycle set out in FIG. 3. Other pressure time cycles for this type epoxy are seen in FIGS. 4 and 5, the difference lying in the process temperature.

Other suitable bonding agents include polyesters, other polymers, other epoxies, liquid or low melting point glasses and low melting point metals. Each has a specific optimum process temperature and pressure-time cycle generally similar to that of epoxy, and which can be determined by procedures well known to persons skilled in the art. The adhesives and the bonding of transducer elements by such adhesives are per se known in the prior art.

As noted, the time-rate of change of pressure is increased substantially toward the end of the cycle, as illustrated in FIG. 3. Other cycles—for example, a pure linear pressure-time relation or one in which the main pressure increases occur early in the cycle—do not produce nearly the quality of bonds achieved by the cycle described. It was found, for example, that increasing the pressure linearly to its terminal value during the relatively short interval of several minutes' results in a bond whose thickness varies by as much as a factor of 100.

The gradual pressure increase allows the bonding agent to flow outwardly from the center through a relatively wide channel. Sufficient maximum applied pressure is about 400 p.s.i.; for most structures, however, the practical upper limit is well in excess of this.

The pressure-time cycle varies in duration depending on the bonding agent. With DER brand epoxy the cycle requires at least fifteen minutes but not more than two hours, depending upon its curing characteristics. Typically, the cycle takes about sixty minutes for epoxy, as set out in the graph of FIG. 3.

Generally, the above-mentioned pressure-time cycle may be described mathematically by the relationship $P = KT^{(x)}$ where $x$ may vary between approximate limits of 1 and 3, and where K is of the order of 1 p.s.i./minute. Both K and $x$ depend on the viscosity of the bonding agent, the flexural rigidity of the transducer, and the flexural rigidity of the pressure-applying diaphragm. For the DER epoxy used, it has been found that where $x \approx 2$, the process results are optimal.

Apparatus for carrying out the above-described process is pictured in FIG. 6 and thereafter. As seen in FIGS. 6 and 7, the overall bonding tool generally designated 10 comprises a lower frame 11, an upper frame 12, a pair of joining pedestals 13 and a substrate jig 14. The purpose of these components, broadly, is to fixedly position a substrate surface with respect to an expansible pressure member.

Lower frame 11 comprises a pair of side plates 15 firmly attached by suitable means, e.g., countersunk Allen bolts, to a base plate 16. Two locating pins 17 for jig 14 are mounted on base plate 16. Pedestals 13 are firmly secured as with bolts 18 to base plate 16.

Upper frame 12 comprises a pair of side plates 19 firmly attached to a base plate 20. Base plate 20 has an elongated lengthwise slot 21 and is secured through bolts 18 to the upper ends of pedestals 13.

Figure 9:
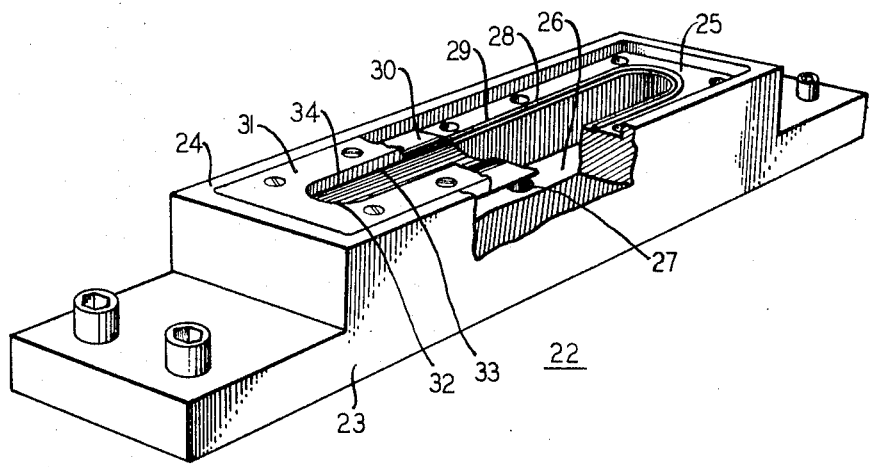
FIG. 9 is a bottom perspective of the fixture pressure head.

To the underside of base plate 20, as shown in FIGS. 7 and 9, an assembly 22 is bolted which comprises a block 23 with a raised portion 24 that has a narrow side ridge 25 defining a recessed interior area. In the latter's center, running lengthwise, is a reservoir 26 with an entrance 27. A seal slot 28 with a hydraulic seal 29 runs around the rim of reservoir 26. An elastic sheet or bag 30, composed of neoprene or like material capable of withstanding the required pressures, fits into the recessed interior and is there held by a plate 31 that is secured at several places to the floor of the recess. Plate 31 includes an elongated slot 32 located above reservoir 26. Importantly, the inner edge 34 of plate 31 is rounded to allow controlled slippage of the diaphragm.

Substrate jig 14 comprises a pair of side plates 35 with top and bottom end spacers 36 such as shown in FIG. 8, or with end spacers 37 such as shown in FIG. 6. Spacers 36 accommodate square or rectangular delay line shapes and spacers 37 accommodate triangular delay line shapes. All spacers are fastened to side plates 35. A plurality of thumbscrews 38 situated on both of the side plates 35 help affix the lateral position of devices such as 1 or the like.

Pins such as 39 placed in the top edge of each plate 35 serve to locate a top assembly 40, best shown in FIG. 8. Top assembly 40 comprises a plate 41 with an elongated slot 42 across which is secured a resilient sheet 43 of thin polyethylene terephthalate, for example. Slot 42 is provided with a curvature 45 on its top edges to allow elastic bag 30 to expand into slot 42 with a large radius of curvature. Locating holes in the bottom edges of assembly 40 mate with pins 39. Similarly, the top surfaces 46 of plate 41 contact the bottom surfaces of edge 25 and of plate 31 when the jig 14 is in position in bonding tool 10.

Figure 10A:
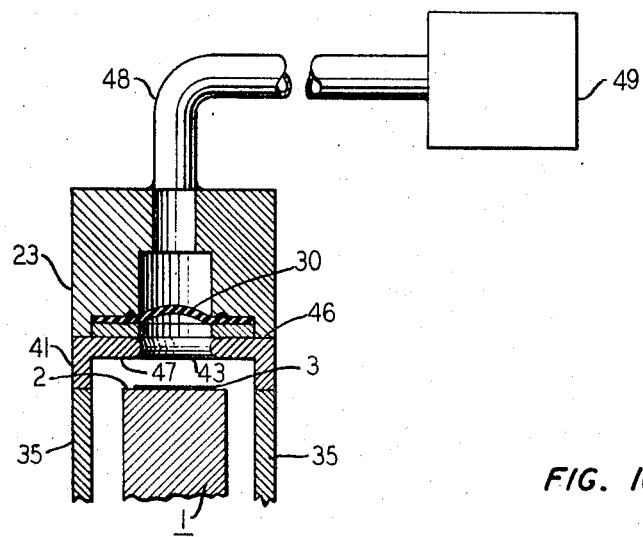
FIGS. 10A–10C are sectional side views of the fixture, showing the bonding action.
Figure 10B:
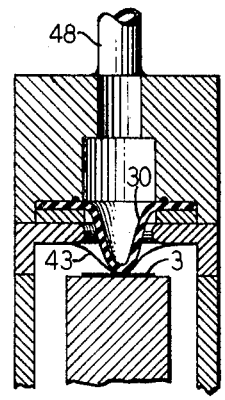
Figure 10C:
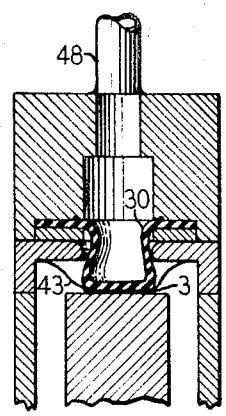

The position of substrate jig 14 when installed between bases 16 and 20 of bonding tool 10 is shown in FIGS. 10A–10C, with reference to which the practice of the inventive process will shortly be described. It is critical that between 2 and 10 mils clearance, depending on the rigidity of elastic bag 30, be provided between the upper surface of transducer 3 and the lower surface of resilient sheet 43. This clearance is exaggerated for emphasis in FIGS. 10A–10C. The sheet 43, which prevents elastic bag 30 from sticking, otherwise will not function. It is also highly desirable that bag 30 be bubbled upwardly such as shown at 33 in FIG. 9 before pressure is applied. Otherwise, it is very difficult to contend with the extraneous pressures that might exist prior to beginning the cycle if bag 30 were distended downwardly, for example.

After the bonding agent has been applied as earlier described, the pressure-time cycle selected is initiated through application of hydraulic pressure to reservoir 26 through line 48 from cycler 49, with the apparatus held at the process temperature. The initial pressure of, say 5 p.s.i., brings the bag through slots 32 and 42. Bag 30 contacts transducer 3 all along its centerline, as seen in FIG. 10B, with a uniform pressure. As the pressure is increased, the bag 30 expands further, forcing the bonding agent outwardly from both sides of the transducer's centerline. In the process of increasing the pressure, it is usually advantageous that bag 30 will at some time travel at least to the edges of the transducer as shown in FIG. 10C. For some bonds, it may be advantageous to advance the pressure sufficiently to allow bag 30 to travel down over the sides of the transducer. At any given time, the pressure applied to the bond is uniform, and accordingly, the final pressure is uniform. After the final pressure is applied and the bonding agent is cured, the pressure may be removed. Bag 30 reverts to the position shown in FIG. 10A. The advantageous upward bubble shape 33 of bag 30 is achieved by preforming the bag to a cross section substantially as shown in FIG. 10A.

For a delay line bond, the entire process is carried out in an extremely clean environment, free of all particulate matter larger than the desired bond thickness. The bonding agent, advantageously, is also filtered by conventional pumping through grids which, for the delay line bonds described, should be a 4 millionths inch pore size. While the bead method of applying the bonding agent to the substrate was suggested, any method that permits it to flush and prevents air entrapment will suffice. Similarly, the expansion of bag 30 upon the transducer surface can be as a constantly larger circle.

A highly utilitarian aspect of the inventive process is that each bond for which the transducer and adhesive are transparent can readily contain a built-in interferometer with which the uniformity and thickness of the bond can be determined. This is accomplished by depositing prior to bonding a semireflecting layer, for example, about 60 A. of chromium, on the lower polished surface of the transducer, and a full reflecting layer deposited on the polished substrate surface and consisting, for example, of 500 A. chrome-2000 A. gold-300 A. nickel. A suitable source of monochromatic light (not shown) is employed to illuminate the interface. Any particles present or any irregularity in the bond will generate optical interference patterns between the semi- and full-reflecting layers that can be evaluated visually. Given the indices of refraction of the constituent parts and the wavelength of the illuminating light, it is easy to determine the absolute size of a $2/10$ micron dirt particle without the aid of a microscope. With an appropriate viewing mechanism, it is possible to watch the bond even as it is being formed.

The mechanism responsible for this is a general one stemming from the fact that there is, in the opposing slabs, considerable flexural rigidity which produces a mechanical amplification of the diameter of the particle causing the disturbance. For 3 mil Y-cut quartz, this amplification is about 1000:1, and accordingly the area of disturbance is increased by a factor of $10^6$. The amplification factor is larger for more rigid slabs and smaller for less rigid ones, and hence is adjustable.

It is readily seen that this facet of the invention has broad application for detecting particulate matter not only in an epoxy bond, but in any liquid or gas and also in certain solids. The procedure for liquids is the same as previously described for bond formation except that the liquid in question would replace the bonding agent. The procedure for gases would be to filter, say to $0.1\mu$, a given volume of gas and dissolve the filter in a suitable solvent, thereby suspending the particulate matter in the solvent, and then proceeding as for liquids. Before being employed as such, any solvents first should be tested by themselves for freedom from particulate matter. Low melting point solids can be tested by elevating the temperature of the system above the melting point of the solid and proceeding as for liquids. Still other solids could be tested by dissolving them in suitable solvents and proceeding as for liquids.

It is understood that the embodiment described is merely illustrative of the inventive concept disclosed and herein claimed. Many variations may be practiced by persons skilled in the art without departing from the spirit and the scope of the invention.

We claim:

1. Apparatus for adhesively bonding two flat slabs comprising:
   a jig comprising a lower frame, an upper frame and means rigidly connecting said lower and upper frames;
   means for rigidly mounting a first slab in said jig generally parallel and adjacent to a lower face of said upper frame with the second slab disposed on top of the first slab;
   a plate connected to the upper side of said mounting means and including a first aperture disposed above said second slab;
   a pressure chamber;
   a resilient membrane disposed across said chamber;
   a retaining block for fixing said membrane in such position with said membrane extending into said chamber in absence of pressure, said block including a second aperture;
   means for mounting said pressure chamber upon the lower face of said upper frame, with said first aperture substantially adjacent to said second aperture; and
   means for applying pressure to said chamber in initially gradual increments followed by a relatively larger time-rate of change of pressure;
   said membrane being responsive to said pressure increments for expanding downwardly through said first and second apertures to contact the second slab initially at its center and thereafter to expand outwardly across it.

2. Apparatus in accordance with claim 1 wherein said resilient membrane is comprised of neoprene, and wherein said plate further comprises an elastic sheet of polyethylene terephthalate stretched across the underside of said second aperture to prevent said membrane from contacting any bonding agent.

3. Apparatus in accordance with claim 1, wherein the bottom surface of said polyethylene terephthalate sheet is located within a range of 2–10 mils from the top of said second slab.

4. Apparatus in accordance with claim 2, wherein said second aperture further comprises substantially rounded top edges to facilitate travel of said neoprene membrane through said second aperture.

5. A process for adhesively bonding a transducer to a substrate comprising the steps of:
   applying an adhesive bonding agent to the interface between said transducer and said substrate;
   applying pressure initially at a central portion of said interface; and
   thereafter while maintaining the pressure on said central portion extending the area of pressure application gradually outward from said central portion until said area embraces the entire said interface.

6. A process pursuant to claim 5, wherein said central portion comprises a central line of said interface and wherein said bonding agent applying step further comprises applying said agent along said central line.

7. A process pursuant to claim 5 or claim 6, wherein the step of extending the area of pressure application is achieved concurrently with a gradual increase of said applied pressure.

8. A process pursuant to claim 5 or claim 6 wherein the step of extending the area of pressure application is achieved with an increase of said applied pressure, the rate of pressure increase being sufficiently low to allow an unimpeded flow of said bonding agent outwardly toward the transducer edges; and wherein said process comprises the further step of substantially increasing the time-rate of change of applied pressure at a late stage of the pressure application.

References Cited

UNITED STATES PATENTS

| | | | |
|---|---|---|---|
| 1,384,498 | 7/1921 | Thomas | 100—295 |
| 2,519,661 | 8/1950 | Johnson | 156—580 XR |
| 2,589,403 | 3/1952 | Kurie | 310—9 |
| 2,639,257 | 5/1953 | Szegvari et al. | 161—194 XR |
| 2,956,789 | 10/1960 | Rich | 310—9.1 XR |
| 3,025,419 | 3/1962 | Mettler | 310—9.1 |
| 1,206,656 | 11/1916 | Benedictus | 269—274 |
| 2,357,867 | 9/1944 | Babbitt et al. | 156—580 XR |
| 2,531,660 | 11/1950 | Ziegler | 156—295 |

EARL M. BERGERT, *Primary Examiner.*

W. E. HOAG, *Assistant Examiner.*

U.S. Cl. X.R.

100—211; 156—312, 580